March 17, 1936.　　　　H. B. SMITH　　　　2,034,214
AGITATOR
Filed April 18, 1933
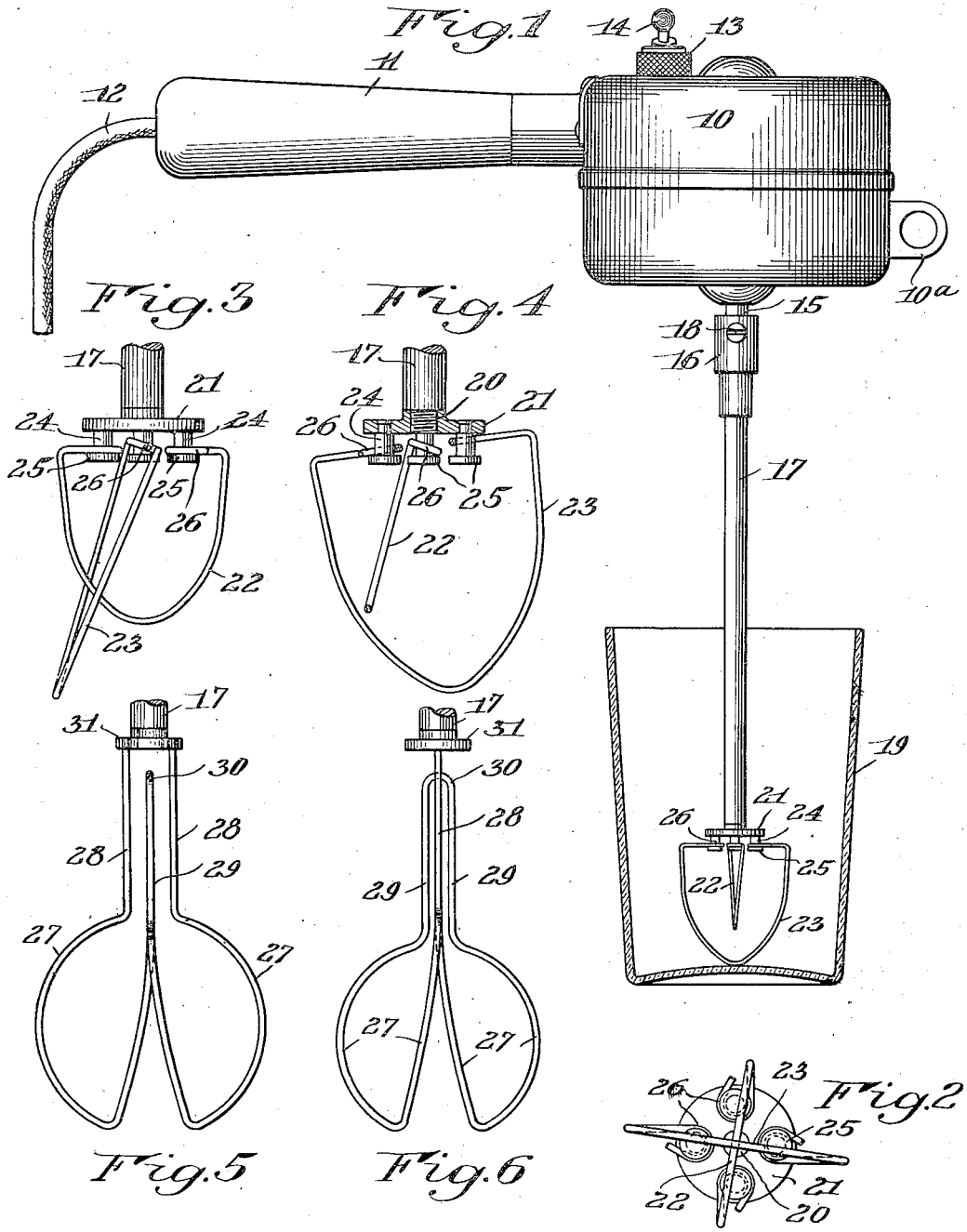
INVENTOR
Harold B. Smith
BY Edward H. Cumpston
his ATTORNEY Patented Mar. 17, 1936

2,034,214

UNITED STATES PATENT OFFICE 2,034,214

AGITATOR

Harold B. Smith, Rochester, N. Y., assignor to Robeson-Rochester Corporation, Rochester, N. Y., a corporation of New York Application April 18, 1933, Serial No. 666,705

11 Claims. (Cl. 259—134)

The present invention relates to agitating means and has for its object to provide an improved device of this class designed to rapidly and effectively beat various liquids and liquid food products in a manner to thoroughly mix the same, the device being one which can be conveniently controlled and economically constructed and operated.

A further object of the invention is to provide an improved agitating device which can be readily attached to the shaft of a small hand controlled electric motor, such, for example, as one of the portable type whereby the beater or agitating means may be readily operated in vessels of different sizes and shapes, the circuit of the motor being under the control of a finger operated switch conveniently located adjacent the handle of the motor.

A further object of the invention is to provide an improved motor driven agitator which can be operated in glass or other fragile receptacles without danger of breaking the same.

A further object of the invention is to provide one or more agitating elements upon the shaft of a motor, adapted to be displaced by centrifugal action during operation of the motor, whereby to increase the effectiveness of the device as a means for thoroughly agitating and mixing the materials to be treated.

A further object of the invention is to provide an improved agitating element which is unitary in form and constructed of yieldable or flexible material capable of being readily deflected by the pressure of the materials to be mixed while operating therein.

To these and other ends the invention resides in certain improvements and combinations of parts, all as will be hereinafter more fully described, the novel features being pointed out in the claims at the end of the specification.

In the drawing:

Fig. 1 is a view in elevation illustrating one embodiment of the invention and showing the agitating means inserted in a glass for operation therein;

Fig. 2 is an inverted plan of the agitator shown in Fig. 1;

Fig. 3 is a fragmentary side elevation of the device showing one of the agitating elements swung outwardly to operating position;

Fig. 4 is a fragmentary part sectional elevation of the agitating means showing the approximate positions assumed by the agitating loops when being rotated by the motor shaft;

Fig. 5 is a side elevation of a modified agitator adapted for attachment to the extension of the motor shaft shown in Fig. 1, and Fig. 6 is a right angle elevation of the agitator shown in Fig. 5.

The same reference numerals throughout the several views indicate the same parts.

The improved agitating device may be driven by any suitable means such, for example, as the small electric motor indicated generally at 10 and having a handle 11 into which the conduit 12 containing the circuit wires for the motor is extended. The switch for controlling the motor circuit is indicated generally at 13 and is provided with a finger controlled operating portion 14, conveniently located for operation by the thumb of the hand employed for holding the motor during operation of the agitating means. A part 10$^a$ is provided on the motor for hanging it up when not in use.

The motor shaft 15 is adapted to receive the socket portion 16 of the shaft extension or rotary element 17 for operating the agitating means carried thereby, the extension being detachably connected with the motor shaft preferably by means of a set-screw 18. It will be understood that shaft extensions of varying lengths may be provided for interchangeable use with the motor, depending on the size or proportions of the vessels or containers in which the agitator is to be operated, one of which is indicated at 19 in the form of an ordinary drinking glass.

The shaft extension 17 has a reduced threaded portion 20 at its free end for receiving the disk-like head 21 for supporting the inner and outer swingingly mounted agitating elements 22 and 23, respectively, each of which is preferably in the form of a loop, as shown.

The disk 21 carries a plurality of depending studs 24, two for each loop, the studs having heads 25 thereon spaced from the disk, as best shown in Figs. 3 and 4. The upper and inwardly turned ends of the loops are provided with ring-shaped portions 26 which surround the studs and are free to move longitudinally thereon, but which rest upon the heads to support the loops when the motor shaft extension is at rest in the position shown in Fig. 1.

The inner diameters of the ring-shaped portions 26 are somewhat greater than the diameters of the studs whereby to permit the loops to be swung outwardly during operation by centrifugal action in order that they may have a relatively wide sweep, which renders them more effective as a means for stirring and thoroughly mixing the contents of the vessel in which they are operated.

The approximate outer positions to which the loops 22 and 23 are swung during operation is indicated respectively in Figs. 4 and 3 of the drawing, in which the positions of the loops are inclined relative to the axis of the driving element 17. In other words, the loops are mounted to swing transversely of their planes or laterally of their axis of rotation. The swinging of the loops in this manner not only increases their efficiency as agitating means for the liquid, but the resulting increase in the pressure upon the loops causes them to act as a governor for the speed of the motor, or in other words, as a brake for reducing the speed at which the parts are driven.

The loops are preferably constructed of flexible or spring-like material such, for example, as wire which can be readily deflected under pressure whereby to increase the "whip" of the agitating elements thus rendering them more effective as a means for beating or agitating the various liquids or liquid products to be treated.

The flexibility of the agitating elements also insures quiet operation of the device and furthermore permits it to be operated in glass and other fragile receptacles without danger of breaking the same.

In addition to the swinging movements of the loops they are each adapted to assume, during operation, a relatively inclined or angular position with respect to the rotary element 17, as indicated by the loop 23 in Fig. 4, or a corresponding reverse tilted position. Thus the flexibility of the agitating means is increased and the swinging parts will therefore more readily accommodate themselves to the different contours or shapes of the receptacles within which they are to be operated.

The angular relationship between the inner and outer loops is best shown in Fig. 2, and if desired, one or more additional loops may be provided, either of the fixed or movable type, as preferred, depending on the size of the container or the quantity and character of the mixture to be agitated.

The limited vertical and lateral swinging movements of the loops, taken with the resilient nature of the material, renders them extremely flexible in operation and as stated above, increases their effectiveness as a means for thoroughly mixing the various liquids or semi-liquids such, for example, as different kinds of drinks containing various food ingredients.

The outward swinging or sweeping movements of the agitator loops causes them to direct the liquid away from the center and toward the sides of the receptacle to a greater extent than has been possible with devices of this class heretofore constructed in which the agitating elements have not been mounted to swing upon the means for driving the same. One advantage of this is to increase the space within the wall of the liquid thrown out against the sides of the glass by the agitator whereby to allow a greater amount of air to enter to more effectively aerate the liquids or other materials to be mixed by the agitator.

In the modification shown in Figs. 5 and 6, angularly disposed loops 27 are provided having substantially parallel supporting portions 28, the loops being provided with extensions 29 lying between the supporting portions and connected by a bent portion 30. The supporting portions 28 are suitably connected with a head 31 which is interiorly threaded to permit the head to be screwed upon the threaded portion 20 of the rotary member 17 whereby the two forms of agitators may be interchangeably used, if desired.

The agitator shown in Figs. 5 and 6 is formed of a single section of flexible or spring-like wire and its construction is such as to render it extremely flexible in operation thereby increasing its effectiveness as an agitating device, and at the same time insuring quietness in operation. It can also be safely operated in glass and other receptacles without danger of breaking the same.

It will be understood that the agitating device, in either of the forms shown, can be made up in different sizes as may be required and interchangeably applied to the rotary element 17, depending upon the size of the receptacle in which the material is to be mixed or the quantity or character of the material.

It will be further understood that the particular means for connecting the loops or other agitating elements with the rotary member 17 for a swinging movement thereon may be varied without departing from the spirit of the invention, as it will be evident that means other than that shown may be provided for supporting the loops, each for a swinging movement on the rotary driving means.

The device may be readily supported and controlled during operation by one hand, the other hand being used, if desired, to hold the glass or other receptacle containing the liquid or, if preferred, the receptacle may be placed upon a table or any suitable support during the beating and mixing operations. In these operations it is preferred to position the agitator within the liquid before closing the switch to start the motor as this method insures satisfactory operation without undue splashing of the liquid.

I claim:

1. A device of the class described, comprising a rotary element adapted for connection with a part for driving the same and having a head at its free end, supporting members on said head, and a plurality of spaced loops depending from and free to move longitudinally of said members for bodily displacement thereon by centrifugal action within the material to be agitated during operation of the rotary element.

2. A device of the class described, comprising a rotary element adapted for connection with a part for driving the same, a plurality of supporting members projecting from said element and a plurality of angularly disposed flexible agitating elements each free to move longitudinally on and adapted to swing transversely of two of said supporting members, one of the agitating elements extending transversely of the plane of another and each being shifted bodily within the material to be agitated under centrifugal action during operation of the rotary element.

3. A device of the class described, comprising a rotary element adapted for connection with a part for driving the same and provided with a disk carrying depending studs having heads spaced from the disk, and a plurality of agitating loops depending from the studs and supported by the heads thereof, the loops being swung upon the studs laterally of the axis of said rotary element during operation of the latter and having a limited movement on the studs longitudinally of said axis.

4. An agitator comprising a head adapted to receive a rotary element for driving the head, and a section of flexible material bent to form spaced supporting portions connected with the head, each of the supporting portions having a loop formed thereon and each loop having an extension, the last mentioned extensions being connected one with another and lying between the supporting portions of the loops.

5. A device of the class described, comprising a rotary element adapted for connection with a part for driving the same and provided with spaced projecting portions, and an agitating element depending from said projecting portions and provided with supporting parts extending about said spaced projecting portions and one having a limited movement longitudinally on its projecting portion to render the agitating element tiltable in a direction to increase its sweep under centrifugal action within the material to be agitated while operating therein.

6. A device of the class described, comprising a rotary supporting element adapted for connection with a part for driving the same, said supporting element having spaced stud-like parts depending therefrom, and an agitating element depending from said stud-like parts and provided with portions substantially surrounding said stud-like parts and having a limited movement longitudinally thereof and also a rocking movement thereon whereby to render the agitating element tiltable in a direction to increase its sweep under centrifugal action within the material to be agitated while operating therein.

7. A device of the class described, comprising a supporting shaft adapted for connection with a part for driving the same, spaced stud-like members connected with said shaft, and an agitating loop the extremities of which terminate in eye-like portions substantially surrounding said stud-like members and free to rock thereon to permit the loop to tilt in a plane substantially parallel to the longitudinal axis of the shaft whereby to render the loop responsive to centrifugal action to increase its sweep while operating within the material to be agitated.

8. A device of the class described, comprising a rotary member adapted for connection with a part for driving the same, spaced supporting parts depending from said member, and an agitating element having supporting portions both pivotally and slidably received by said supporting parts whereby said agitating element will simultaneously swing in one direction and tilt in another direction on said parts during operation of said rotary element, the tilting movement of said agitating element serving to increase its sweep under centrifugal action within the material to be agitated.

9. A device of the class described, comprising a rotary member adapted for connection with means for driving the same, supporting parts upon said member extending longitudinally thereof, and an agitating element having terminal portions pivoted on said supporting parts and permitting said element to have a rocking movement thereon, one of the terminal portions having a limited movement on its supporting part longitudinally thereof whereby to render the agitating element tiltable during its rocking movement in a direction to increase its sweep under centrifugal action during operation of the rotary element.

10. A device of the class described, comprising a rotary member adapted for connection with means for driving the same, said member having a plurality of spaced supporting portions extending longitudinally of the axis of the rotary element, and an agitator comprising a loop having side members terminating in spaced supporting parts pivoted on said supporting portions to permit the loop to swing thereon in one direction, one of said parts being free to move longitudinally of its supporting portion to permit the loop to have a tilting movement in a different direction during said swinging movement.

11. A device of the class described, comprising a rotary element adapted for connection with means for driving the same, said element having supporting parts one extending longitudinally thereof, and an agitator having supporting portions loosely engaging said parts, one of said portions moving lengthwise of said longitudinally extending part under centrifugal action during operation of the rotary element to permit the agitator to be tilted whereby to increase its sweep within the material to be treated.

HAROLD B. SMITH.